United States Patent
Borden et al.

(10) Patent No.: US 7,203,711 B2
(45) Date of Patent: Apr. 10, 2007

(54) SYSTEMS AND METHODS FOR DISTRIBUTED CONTENT STORAGE AND MANAGEMENT

(75) Inventors: Bruce Borden, Los Altos, CA (US); Russell Brand, Redwood City, CA (US)

(73) Assignee: Einstein's Elephant, Inc., Los Altos, CA (US)

( * ) Notice: Subject to any disclaimer, the term of this patent is extended or adjusted under 35 U.S.C. 154(b) by 567 days.

(21) Appl. No.: 10/443,006

(22) Filed: May 22, 2003

(65) Prior Publication Data

US 2004/0236801 A1    Nov. 25, 2004

(51) Int. Cl.
  *G06F 17/30* (2006.01)
  *G06F 12/00* (2006.01)
(52) U.S. Cl. .................... 707/204; 707/205
(58) Field of Classification Search ............. 707/4, 707/5, 10, 100–103 R, 104.1, 200, 202–205; 709/201, 203, 213, 217; 715/501.1, 513
See application file for complete search history.

(56) References Cited

U.S. PATENT DOCUMENTS 5,966,730 A * 10/1999 Zulch .................. 711/162
6,704,118 B1 * 3/2004 Hull et al. ............. 358/1.15
6,775,665 B1 * 8/2004 Piersol ..................... 707/4
7,035,468 B2 * 4/2006 Yogeshwar et al. ..... 382/232
2004/0001104 A1 * 1/2004 Sommerer et al. ...... 345/811
2004/0177319 A1 * 9/2004 Horn .................. 715/501.1

* cited by examiner

Primary Examiner—Hosain Alam
Assistant Examiner—Jacques Veillard
(74) Attorney, Agent, or Firm—Sterne, Kessler, Goldstein & Fox P.L.L.C.

(57) ABSTRACT

Systems, methods and computer program products for distributed content storage and management are provided. The distributed content storage and management system includes an indexed archive system; information source agents, information source clients; and a network to couple the information source clients to the indexed archive system. In an alternate embodiment, a legacy back-up system is also used. The index archive system includes an information entryway for gathering file information, a triage engine, an indexing engine, a metadata engine, and a content engine. These engines generate content indexes, metadata and metadata indexes from received files and store them along with the file content into a set of repositories, including an indexing repository, a metadata repository and a content repository. Methods are provided for the efficient retrieval and indexing of files, and for the storage of files, file content, content indexes, metadata and metadata indexes.

19 Claims, 17 Drawing Sheets

SYSTEMS AND METHODS FOR DISTRIBUTED CONTENT STORAGE AND MANAGEMENT

BACKGROUND OF THE INVENTION

1. Field of the Invention

The invention relates to distributed content storage and management, and more particularly, to storage and content indexing of files located on electronic information sources.

2. Background of the Invention

Distributed content storage and management presents a significant challenge for all types of businesses—small and large, service and products-oriented, technical and non-technical. As the Information Age emerges, the need to be able to efficiently manage distributed content has increased, and will continue to increase. Distributed content refers to files that are distributed throughout electronic devices within an organization. For example, an organization may have a local area network with twenty desktop computers connected to the network. Each of the desktop computers will contain files—program files, data files, and other types of files. The business may also have users with personal digital assistants (PDAs) and/or laptops that contain files. These files collectively represent the distributed content of the organization.

Essentially, two disparate approaches to distributed content storage and management have emerged. One approach relates to backing-up files, principally for the purpose of being able to restore files if a network or computer crashes. Under the back-up approach, the focus is on preserving the data by copying data and getting the data "far away," from its original location, so that it can not be accidentally or maliciously destroyed or damaged. Generally, this has meant that back-up files are stored on tape or other forms of detached storage devices, preferably in a separate physical location from the original source of the file. Given the desire to keep the data safe or "far away," file organization is by file name or volume where the data is stored, and accessing or retrieving files stored in a back-up system is often slow or difficult—and in some cases, practically impossible. Furthermore, because the backed-up files are not regularly accessed or used, when a back-up system does fail, often no one will notice and data can potentially be lost.

The other approach to distributed content management relates to content management of files. The content management approach is focused on controlling the creation, access and modification of a limited set of pre-determined files or groups of files. For example, one approach to content management may involve crude indexing and recording information about user created document files, such as files created with Microsoft Word or Excel. Within current content management approaches, systems typically require a choice by a user to submit a file to the content management system. An explicit choice requirement by a user, such as this, limits the ability of a system to capture all appropriate files and makes it impossible for an organization to ensure that it has control and awareness of all electronic content within the organization.

Neither approach fully meets the growing need to effectively manage distributed content. In user environments where only a back-up system is in place, easy access to stored files is difficult and access to information about a specific file is often impossible. In user environments where only a content management system exists, many files are left unprotected (i.e., not backed-up) and the indexing and searching capabilities are limited. In user environments where a back-up system and a content management system are both used, cost inefficiencies are introduced through redundancies. Moreover, even when both a back-up system and a content management system as are in use today are in place, the ability to manage and control the electronic content of an organization remains limited.

What is needed is a system to cost-effectively store and manage all forms of distributed content.

What are also needed are efficient methods to store distributed content to reduce redundant and inefficient storage of backed-up files.

What is also needed are efficient methods to gather data related to file content that will spawn further user applications made possible by the sophisticated indexing of the invention.

SUMMARY OF THE INVENTION

The invention is directed to systems, methods, and computer program products for distributed content storage and management. The distributed content storage and management system includes an indexed archive system; information source agents, such as desktop computers, laptop computers, and server computers; information source clients; and a network to couple the information source clients to the indexed archive system. In an alternate embodiment, a legacy back-up system also exists along with a proxy device coupled to the indexed archive system. In another embodiment, in which a legacy back-up system exists, an interface is provided that enables the indexed archive system to gather file information being transferred from information source clients to the legacy-back up system without the use of a proxy device.

The indexed archive system serves as the main element used to manage distributed content, and includes an information entryway for gathering file information, a triage engine for managing the manipulation of the file information, an indexing engine, a metadata engine, and a content engine. These engines extract content indexes, metadata and metadata indexes from received files and store them, along with the file content, into a set of repositories. The repositories include an indexing repository, a metadata repository and a content repository.

In addition, the indexed archive system includes a user interface and a search engine for allowing users to control the system, and access information stored within the indexed archive system. In an alternate embodiment developed to work with a legacy back-up system, a file gathering interface and a file administration interface are included. In another alternate embodiment, the indexed archive system does not include a content engine or content repository. In this embodiment, the indexed archive system relies on a legacy back-up system to store file content.

Information source agents reside within each of the information sources in which distributed content is to be managed. These agents can make available file information to the indexed archive system. In one embodiment, the information source agent includes an agent controller, a collection agent and a modification agent. In another embodiment, the information source agent does not include a modification agent.

A set of methods is also provided for effectively gathering distributed content within files from information source clients. These methods include the steps of retrieving files; generating file content indexes; extracting metadata; such as usage information, time of back-up, etc.; generating metadata indexes; and storing file content, file content indexes, metadata and metadata indexes. Associated with each file content is a unique identifier, referred to as a primary identifier. In addition, methods are provided to ensure efficient storage of files and easy access to file information once it has been stored.

The invention has several benefits. First, the invention provides an integrated system that provides both file back-up and content management. The integration of these functions is likely to produce cost savings to network administrators. Second, the invention enables a network administrator to back-up all files within a network (as well as laptops and other devices), while also making the content information of the files easily retrievable and accessible. Third, the invention stores files, content information and metadata regarding the files in a systematic manner that will allow sophisticated applications to be developed. Fourth, the invention enables more efficient storage by recognizing similarities among files and storing only that information that is not redundant or is important to an organization.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical, or functionally or structurally similar elements. The drawing in which an element first appears is indicated by the left-most digit(s) in the corresponding reference number.

DETAILED DESCRIPTION OF THE INVENTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
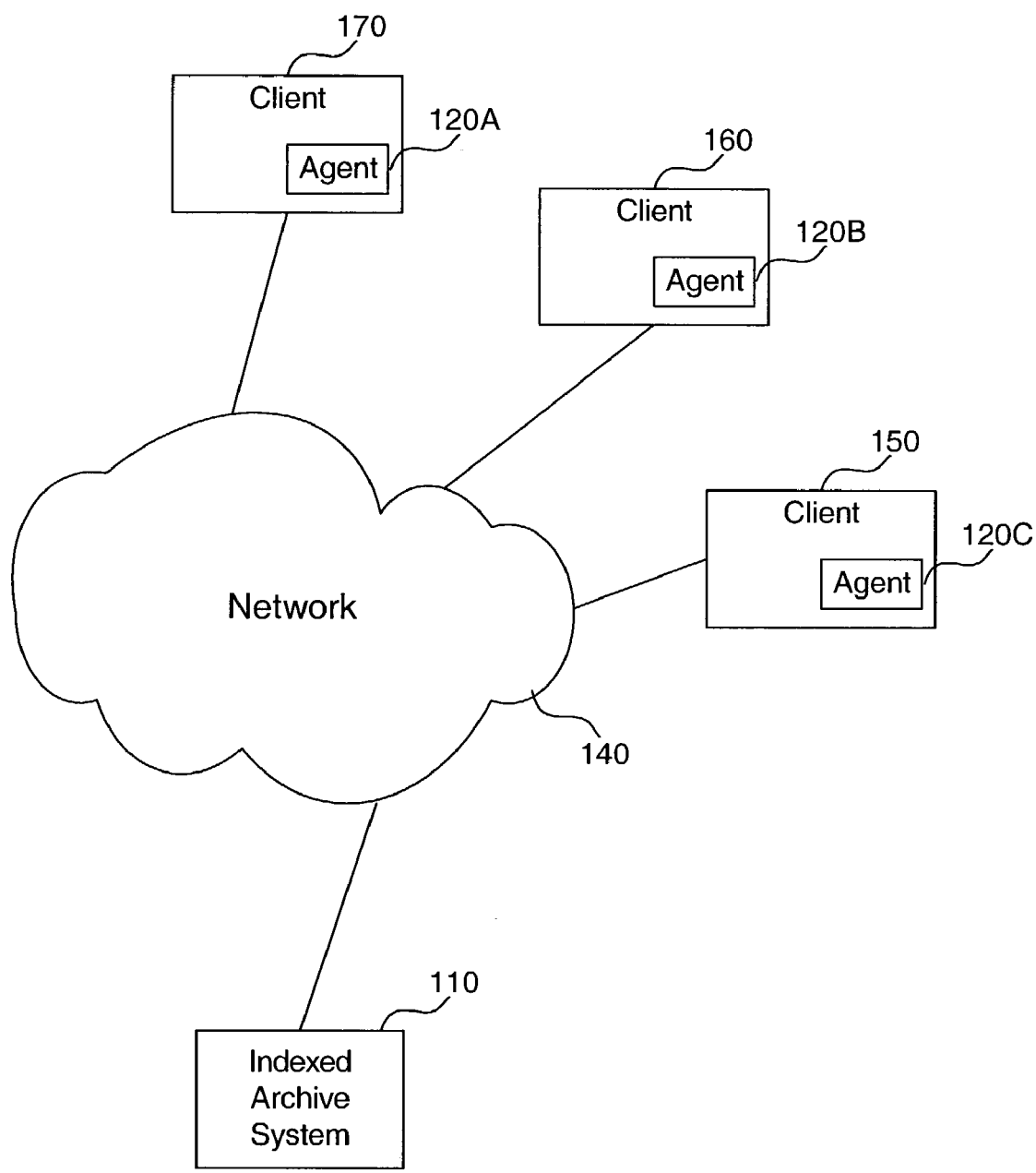
FIG. 1 is a diagram of a distributed content storage and management system, according to an embodiment of the invention.

FIG. 1 illustrates distributed storage and content management system 100, according to an embodiment of the invention. Distributed storage and content management system 100 includes information source clients 150, 160 and 170 coupled together through network 140. A local area network, a wide area network, or the Internet are examples of this arrangement of information source clients and network. Furthermore, network 140 could be a combination of networks, and the number of information source clients could range from one to more than tens of millions. Most commonly the invention will likely be implemented in networks containing from a few to thousands of information source clients. Network 140 can be a wireline or wireless network or a network with both wireline and wireless connections. Information source clients can be any type of device capable of storing files. Examples of information source clients include desktop computers, laptop computers, server computers, personal digital assistants, CDROMs, and printer ROMs. These information source clients may or may not be connected to a network.

The content management portions of distributed storage and content management system 100, include indexed archive system 110 and information source agents 120A, 120B and 120C. Information source agents 120A, 120B and 120C can be software modules, firmware or hardware installed within the information source clients 150, 160 and 170. Information source agents 120A, 120B, and 120C contain modules to communicate with indexed archive system 110 over network 140 or over another network not used for the purpose of networking the information source clients. The basic functions of information source agents 120A, 120B and 120C are to transfer files to the indexed archive system, to generate file information, and to manage files located on the information source client. In an alternative embodiment, information source clients may not all have information source agents. In this case, the information source agents would not be local to the information source client, but rather would be located elsewhere and would gather needed information remotely.

Indexed archive system 110 has four basic functions that include backing-up files stored on the information source clients 150, 160 and 170, storing file information, indexing file contents, and enabling searching of indexed file information. The file information can consist of the actual file, portions of a file, differences between the file and another file, content extracted from the file, metadata regarding the file, metadata indexes, content indexes and a unique file identifier.

As used herein, file is broadly defined to include any named or namable collection of data located on an electronic device. Examples of files include, but are not limited to, data files, application files, system files, and programmable ROM files. Metadata can consist of a wide variety of data that characterizes the particular file. Examples of metadata include, but are not limited to file attributes; such as the file name, the information source client or client(s) where the file was located; and the date and time of the back-up of the file. Additionally, metadata can include, but is not limited to other information, such as pointers to related versions of the file; a history of file activity, such as use, deletions and changes; and access privileges for the file.

Figure 2:
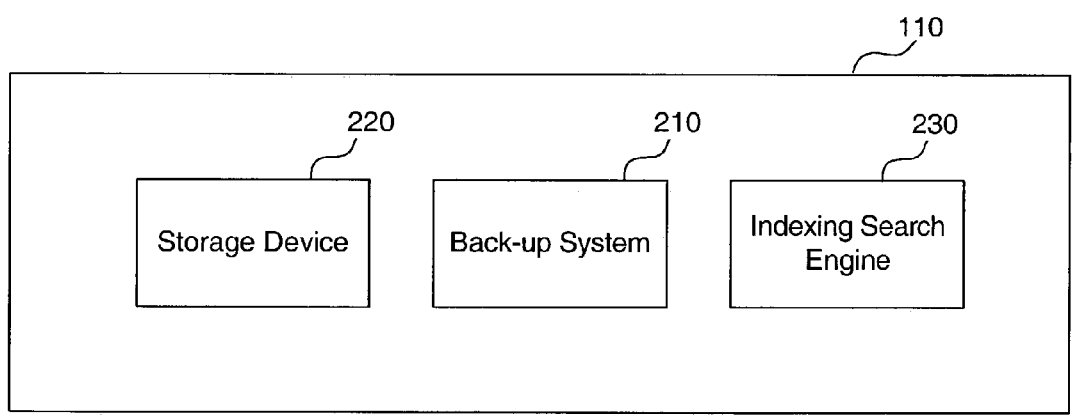
FIG. 2 is a diagram of an indexed archive system, according to an embodiment of the invention.

FIG. 2 depicts indexed archive system 110, according to an embodiment of the invention. Indexed archive system 110 includes back-up system 210, storage device 220, and indexing search engine 230. Back-up system 210 is coupled to storage device 220 and indexing search engine 230. Back-up system 210 includes capabilities to gather files from information source clients, provide file information to storage device 220 for storage and interface with indexing search engine 230 to index file information and retrieve file information based on the searching capabilities of indexing search engine 230.

Back-up system 210, storage device 220 and indexing search engine 230 can be implemented on a single device or multiple devices, such as one or more servers. Similarly, each of the components—back-up system 210, storage device 220 and indexing search engine 230—can be implemented on one or multiple devices. For example, storage device 220 can be implemented on multiple disk drives, multiple tape drives or a combination of disk drives and tape drives. Similarly, indexing search engine 230 could be implemented on a desktop computer, a laptop computer, or a server computer or any combination thereof. Moreover, each of the components can be co-located or distributed remotely from one another.

Figure 3:
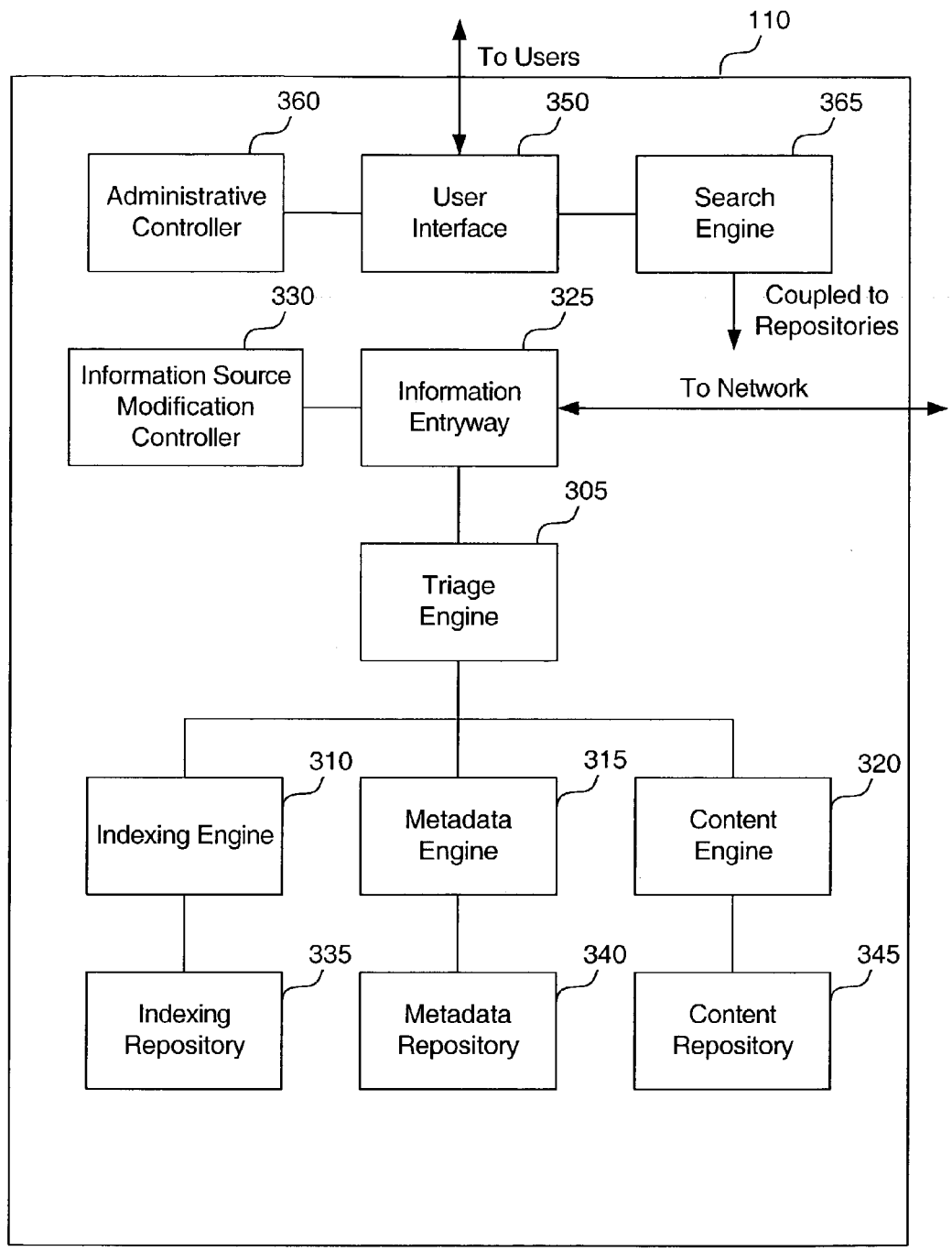
FIG. 3 is a diagram of an indexed archive system, according to an embodiment of the invention.

FIG. 3 depicts indexed archive system 110, according to another embodiment of the invention. FIG. 3 provides one embodiment for implementing the general embodiment described with reference to FIG. 2. Indexed archive system 110 includes a set of engines: triage engine 305, indexing engine 310, metadata engine 315 and content engine 320. Additionally, indexed archive system 110 includes a set of repositories: indexing repository 335, metadata repository 340, and content repository 345. Other elements of indexed archive system 110 are information entryway 325, information source modification controller 330, user interface 350 and search engine 365. Finally, indexed archive system 110 includes administrative controller 360 that provides overall administration and management of the elements of indexed archive system 110.

Information entryway 325 receives file information from a set of information source client agents, such as agents 120A, 120B, and 120C, over a network, such as network 140. Information entryway 325 can also receive other forms of information about information sources and network activity. Information entryway 325 makes received file information available to triage engine 305. Information entryway 325 also transmits control messages to information source client agents. Information entryway 325 is coupled to triage engine 305 and information source modification controller 330.

Information source modification controller 330 can send requests through the information entryway 325 to information source agents to modify files located on the information source clients or to request that an information source agent transmit file information to information entryway 325.

In addition to being coupled to information entryway 325, triage engine 305 is coupled to indexing engine 310, metadata engine 315 and content engine 320. Triage engine 305 monitors information that has arrived at information entryway 325. Triage engine 305 informs index engine 310 what new content and/or metadata needs to be indexed. Similarly, triage engine 305 informs metadata engine 315 and content engine 320 what data needs to be processed and stored.

Indexing engine 310 is also coupled to indexing repository 335. Upon being notified by triage engine 305 that file information needs to be processed, indexing engine 310 will generate a content index for the file that was received. The index will then be stored in indexing repository 335. Indexing repository 335 will contain the searchable attributes of the file content and/or metadata along with references that identify the relationship of the file content or metadata to one or more primary identifiers. A primary identifier is a unique identifier for a file content.

Metadata engine 315 is also coupled to metadata repository 340. Upon being notified by triage engine 305 that file information needs to be processed, metadata engine 315 will generate or update metadata for the file that was received. Metadata engine 315 also generates a metadata index that can be used for searching capabilities. The metadata along with the relationship between the metadata, metadata index, and a primary identifier will then be stored in metadata repository 340.

Content engine 320 is also coupled to content repository 345. Upon being notified by triage engine 305 that file information needs to be processed, content engine 320 will store the file content that was received. The file content along with the relationship between the content data and a primary identifier will be stored in content repository 345.

User interface 350 enables users to control and access indexed archive system 110. User interface 350 can support general and administrative use. User interface 350 can include access privileges that allows users various control levels of indexed archive system 110. Access privileges can be set to allow administrative control of indexed archive system 110. Such control can allow an administrator to control all functions of the system, including changing basic operating parameters, setting access privileges, defining indexing and search functions, defining the frequency of file back-ups, and other functions typically associated with administrative control of a system. Additionally, access privileges can be set to enable general purpose use of indexed archive system 110, such as reviewing file names for files backed-up, and using search functions to find a particular file or files that meet search criteria.

Within user interface 350, a retrieval user interface can exist that facilitates the bulk restoring of an information source client or restoral of individual files. Similarly, within user interface 350, an indexing user interface can exist that enables a user to search for file information or content based on indexed criteria (content and/or metadata).

User interface 350 is coupled to administrative controller 360 and to search engine 365. Additionally user interface 350 can be coupled to an external terminal or to a network to allow remote user access to indexed archive system 110. A graphical user interface will typically be employed to enable efficient use of user interface 350.

Search engine 365 is coupled to user interface 350 and to indexing repository 335, metadata repository 340 and content repository 345. Search engine 365 enables a user to search the repositories for files and information about files. A search engine, such as that used by Google, can be employed within the system.

Administrative controller 360 is coupled to all elements within indexed archive system 110. Administrative controller 360 provides overall system management and control.

Each of the elements of indexed archive system 110 can be implemented in software, firmware, hardware or a combination thereof. Moreover, each of the elements can reside on one or more devices, such as server computers, desktop computers, or laptop computers. In one configuration, the repositories can be implemented on one or more storage devices, such as a tape drive or disk drive. The other elements can be implemented within a server computer or multiple server computers.

Figure 4:
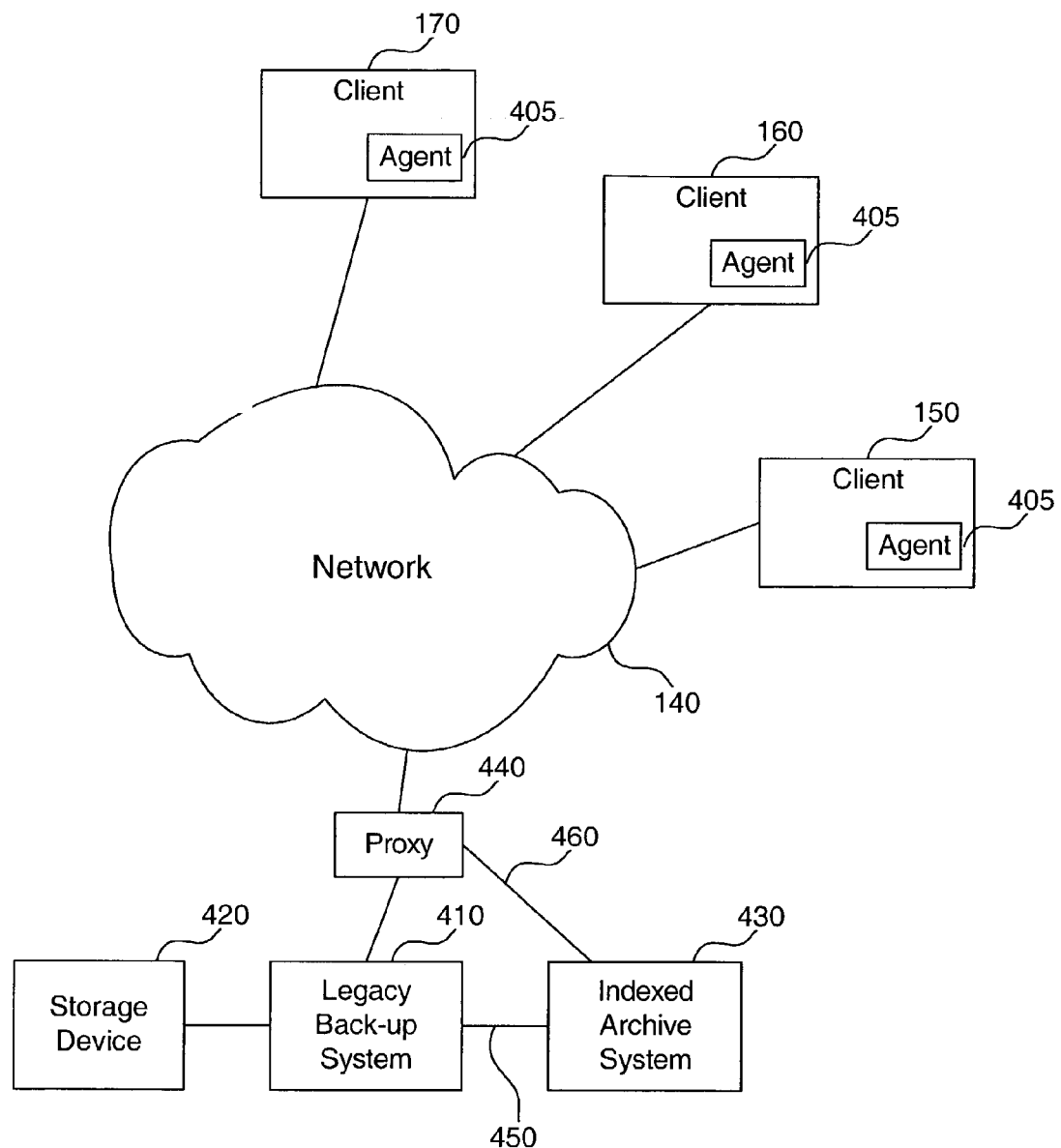
FIG. 4 is a diagram of a distributed content storage and management system integrated with a legacy back-up system, according to an embodiment of the invention.

FIG. 4 provides a diagram of distributed storage and content management system 400 integrated with a legacy back-up system, according to an embodiment of the invention. The difference between distributed storage and content management system 400 and distributed storage and content management system 100 is that within distributed storage and content management system 400 a legacy back-up system exists. Legacy back-up system refers to a file back-up system that currently exists. Example legacy back-up systems include Legato Networker 6 and Veritas storage management systems. Legacy back-up system also refers to any existing or future back-up system that backs-up files.

As shown in FIG. 4, indexed archive system 430 can be implemented to work with legacy back-up system 410 to reduce redundant activities and provide an easy integration of indexed archive system 430 with a customer's network that may already be using a legacy back-up system.

As in distributed storage and content management system 100, distributed storage and content management system 400 includes information source clients 150, 160 and 170 coupled together through network 140. The content management portions of distributed storage and content management system 400, include legacy back-up system 410, storage device 420, indexed archive system 430, proxy 440, and agents 405A, 405B and 405C. Information source agents 405A, 405B, 405C are located within the information source clients, and are agents associated with legacy back-up system 410 that facilitate the transfer of files.

Legacy back-up system 410 is coupled to storage device 420. Legacy back-up system 410 gathers files from information source clients, and backs-up files by storing the files on storage device 420. Proxy 440 resides between legacy back-up system 410 and network 140. Proxy 440 provides a passive interface that allows indexed archive system 430 to gather files or file information as files are collected by legacy back-up system 410. Indexed archive system 430 is coupled to proxy 440 over connection 460. Indexed archive system 430 can also be coupled to legacy-back up system 410 over connection 450. As discussed more thoroughly with respect to FIG. 5, indexed archive system 430 may or may not also store back-up copies of the files being backed up by legacy back-up system 410.

Indexed archive system 430 has four basic functions that include backing-up files stored on the information source clients 150, 160 and 170, storing file information, indexing file contents, and enabling searching of indexed file information. As discussed previously, depending on the amount of redundancy desired, indexed archive system 430 may or may not store entire files for back-up in this embodiment. If indexed archive system 430 does not store actual file back-ups, a pointer will be created identifying where the file is stored.

Figure 5:
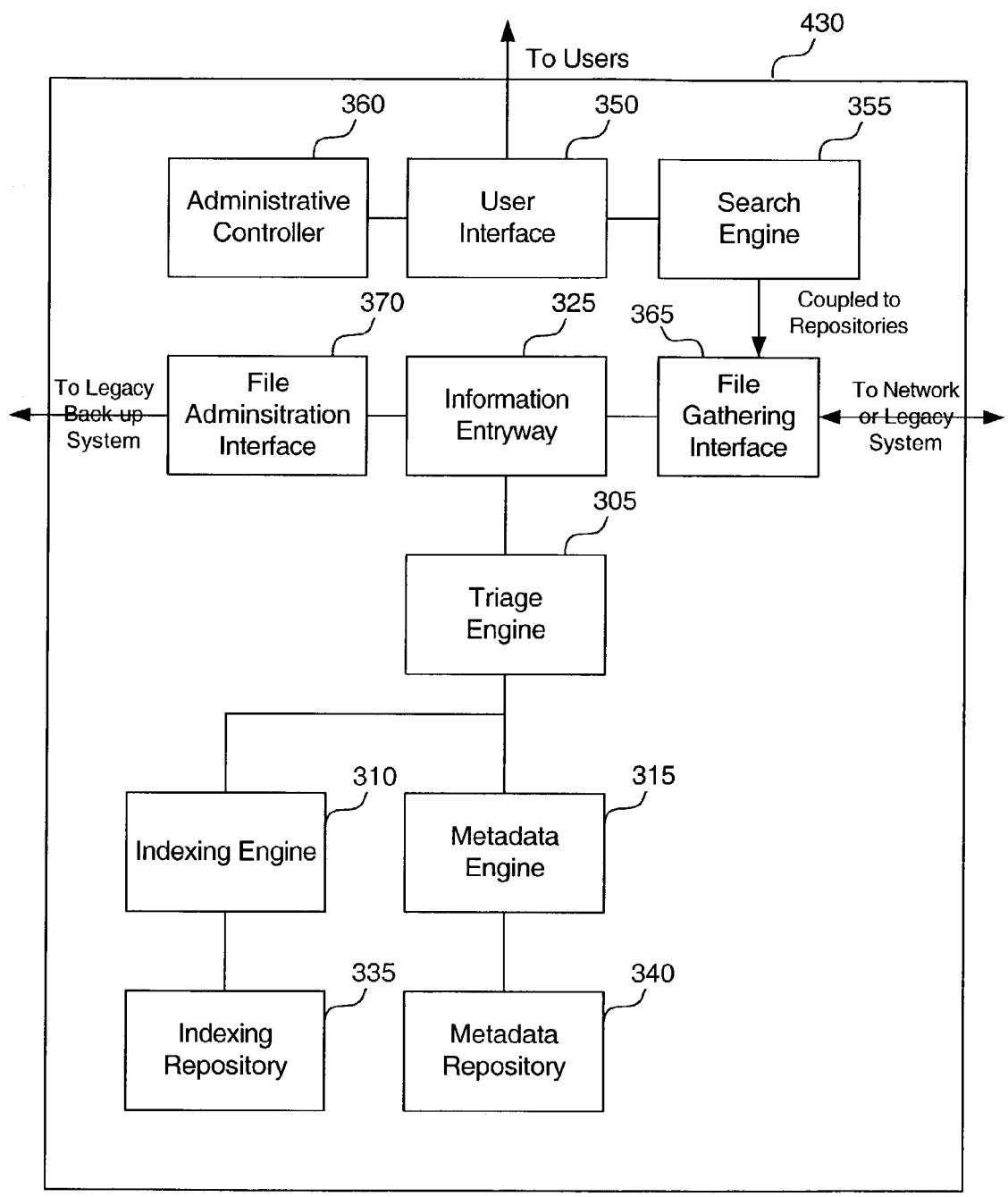
FIG. 5 is a diagram of an indexed archive system with interfaces to a legacy back-up system, according to an embodiment of the invention.

FIG. 5 is a diagram of indexed archive system 430, according to an embodiment of the invention. Indexed archive system 430 is similar to indexed archive system 110, except that it does not include a content engine or a content repository, and it does include file gathering interface 365 and file administration interface 370.

As in the case of indexed archive system 110, indexed archive system 430 includes triage engine 305, indexing engine 310 and metadata engine 315. Additionally, indexed archive system 430 includes indexing repository 335 and metadata repository 340. Other elements of indexed archive system 430 are information entryway 325, user interface 350 and search engine 365. Finally, indexed archive system 430 includes administrative controller 360 that provides overall administration and management of the elements of indexed archive system 430.

As mentioned above, indexed archive system 430 also includes file gathering interface 365. File gathering interface 365 enables indexed archive system 430 to gather files from a proxy, such as proxy 440, to obtain them directly from a legacy back-up system, such as legacy back-up system 450, or to obtain files through some other means, such as sniffing a network on which files are transferred to a back-up system. File gathering interface 365 is coupled to information entryway 325 and provides gathered files and file information to information entryway 325. Additionally, indexed archive system 430 includes file administration interface 370. File administration interface 370 provides coupling with a legacy back-up system for accessing files backed-up and exchanging administrative data with the legacy back-up system. In another embodiment, file administration interface 370 may not be included.

Information entryway 325 receives file information from file gathering interface 365. Information entryway 325 can also receive other forms of information about information sources and network activity. Information entryway 325 makes received file information available to triage engine 305.

In addition to being coupled to information entryway 325, triage engine 305 is coupled to indexing engine 310 and metadata engine 315. Triage engine 305 monitors information that has arrived at information entryway 325. Triage engine 305 informs index engine 310 what new content and/or metadata needs to be indexed. Similarly, triage engine 305 informs metadata engine 315 what data needs to be processed and stored.

Indexing engine 310 is also coupled to indexing repository 335. Upon being notified by triage engine 305 that file information needs to be processed, indexing engine 310 will generate a content index for the file that was received. The index will then be stored in indexing repository 335. Indexing repository 335 will contain the searchable attributes of the file content and/or metadata along with references that identify the relationship of the file content or metadata to one or more primary identifiers.

Metadata engine 315 is also coupled to metadata repository 340. Upon being notified by triage engine 305 that file information needs to be processed, metadata engine 315 will generate or update metadata for the file that was received. Metadata engine 315 will also generate a metadata index for the received file (or update an existing one). The metadata along with the relationship between the metadata and a primary identifier will then be stored in metadata repository 340.

In an alternate embodiment, where indexed archive system 430 is also backing up files, a content engine and a content repository can be included within indexed archive system. In this case, the content engine would be coupled to triage engine 305 and to the content repository. Upon being notified by triage engine 305 that file information needs to be processed, content engine 345 would store the file content that was received. The file content along with the relationship between the content data and a primary identifier will be stored in the content repository.

As in the case of indexed archive system 430, user interface 350 enables users to control and access indexed archive system 110. User interface 350 can support general use and administrative use. Within user interface 350, a retrieval user interface can exist that facilitates the bulk restoring of an information source client or restoral of individual files. Similarly, within user interface 350, an indexing user interface can exist that enables a user to search for file information or content based on indexed criteria (content and/or metadata).

User interface 350 is coupled to administrative controller 360 and to search engine 365. Additionally user interface 350 can be coupled to an external terminal or to a network to allow remote user access to indexed archive system 430. A graphical user interface will typically be employed to enable efficient use of user interface 350.

Search engine 365 is coupled to user interface 350 and to indexing repository 335 and metadata repository 340. Search engine 365 enables a user to search the repositories for files and information about files. A search engine, such as that used by Google, can be employed within the system.

Administrative controller 360 is coupled to all elements within indexed archive system 430. Administrative controller 360 provides overall system management and control.

Each of the elements of indexed archive system 430 can be implemented in software, firmware, hardware or a combination thereof. Moreover, each of the elements can reside on one or more devices, such as server computers, desktop computers, or laptop computers. In one configuration, the repositories can be implemented on one or more storage devices, such as a tape drive or disk drive. The other elements can be implemented within a server computer or multiple server computers.

Figure 6:
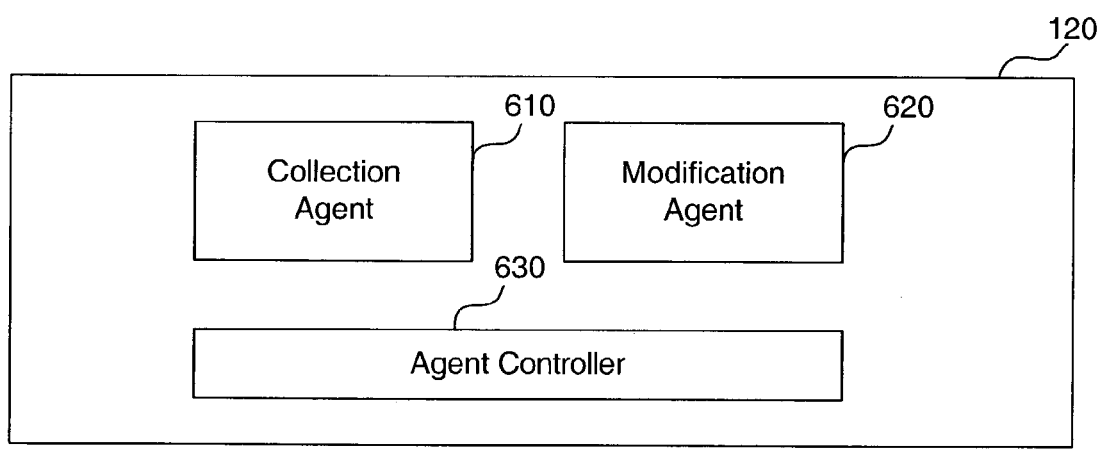
FIG. 6 is a diagram of an information source agent, according to an embodiment of the invention.

FIG. 6 is a diagram of information source agent 120, according to an embodiment of the invention. Information source agent 120 includes collection agent 610, modification agent 620 and agent controller 630. Collection agent 610 and modification agent 620 are coupled to agent controller 630. Collection agent 610 computes, gathers and/or transports file information and other data to an information entryway, such as information entryway 325. Modification agent 620 honors requests to make modifications to the information source, including, but not limited to deleting files, replacing outdated files with current files and replacing files with links or references to files located elsewhere. Security measures are included within information source agent to prevent unauthorized use, particularly with respect to modification agent 620. Agent controller 630 controls the overall activity of information source agent 120. In an alternative embodiment, information source agent 120 does not include modification agent 620.

Figure 7:
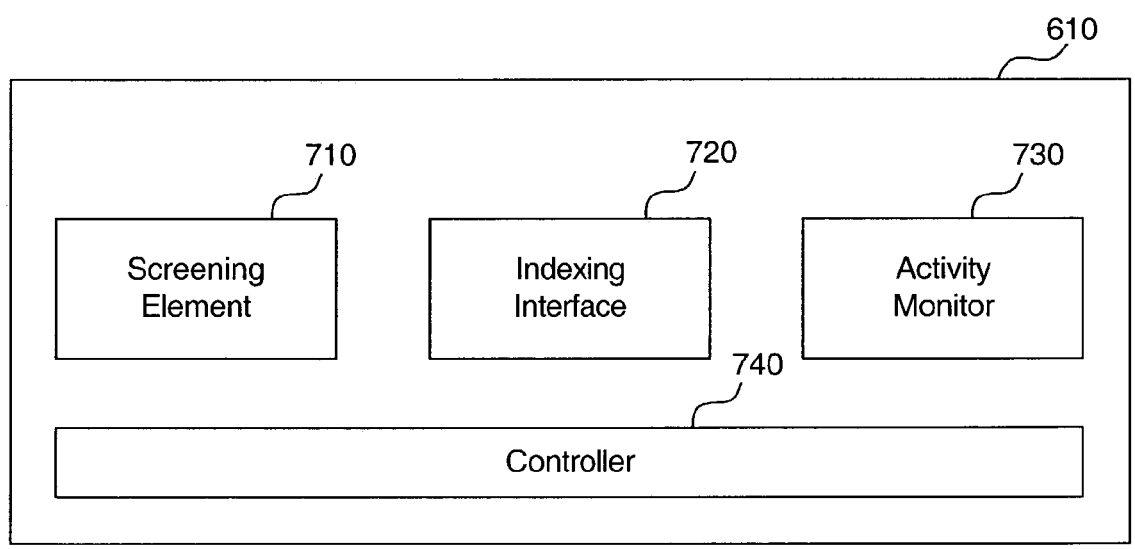
FIG. 7 is a diagram of an information source collection agent, according to an embodiment of the invention.

FIG. 7 is a diagram of an information source collection agent 610. Information source collection agent 610 includes screening element 710, indexing interface 720, activity monitor 730 and controller 740. Screening element 710, indexing interface 720, and activity monitor 730 are coupled to controller 740. Screening element 710 assesses whether a file should be transmitted to an indexed archive system, such as indexed archive system 110. Indexing interface 720 communicates with an indexing system, and can index files locally on the information source client. In an alternate embodiment, information source collection agent 610 does not include indexing interface 720. Activity monitor 730 gathers information about file activity, such as creation, usage, modification, renaming, persons using a file, and deletion. Activity monitor 730 can also gather information about intermediate content conditions of files between times when files are backed up.

Information source client agent 120 can be implemented in software, firmware, hardware or any combination thereof. Typically, information source client agent 120 will be implemented in software.

Figure 8:
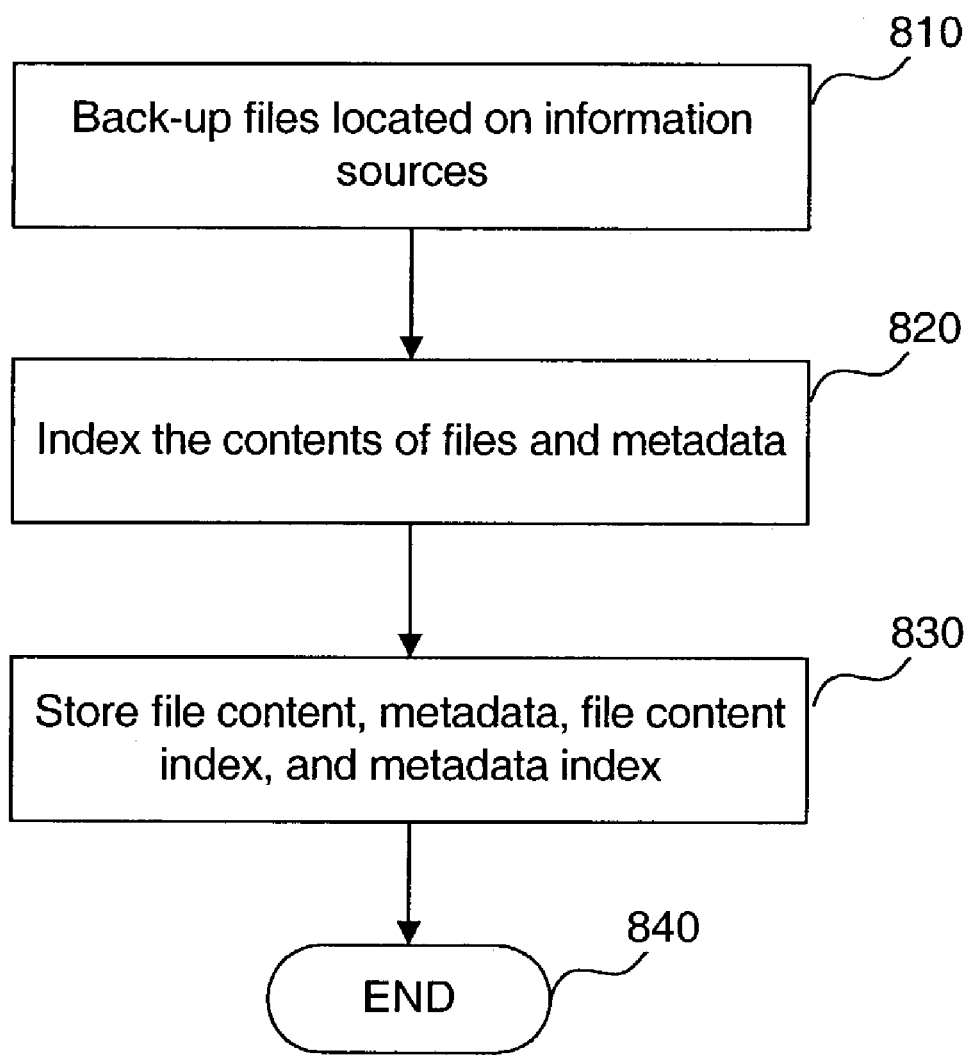
FIG. 8 is a flow chart of a method to store distributed content, according to an embodiment of the invention.

FIG. 8 provides a flow chart of method 800 to store distributed content, according to an embodiment of the invention. Method 800 begins in step 810. In step 810, files located on information source clients are backed-up. For example, in one embodiment indexed archive system 110 would back-up the files located on information source clients 150, 160, and 170. In step 820 metadata and file content are indexed. For example, in one embodiment indexed archive system 110 would generate metadata for files received from information source clients 150, 160, and 170. Indexed archive system 110 would then index the metadata and file content. In step 830, file content, metadata, metadata indexes, and content indexes are stored. For example, in one embodiment indexed archive system 110 would store the file content, metadata, and indexes for both. In step 840, method 800 ends.

Figure 9:
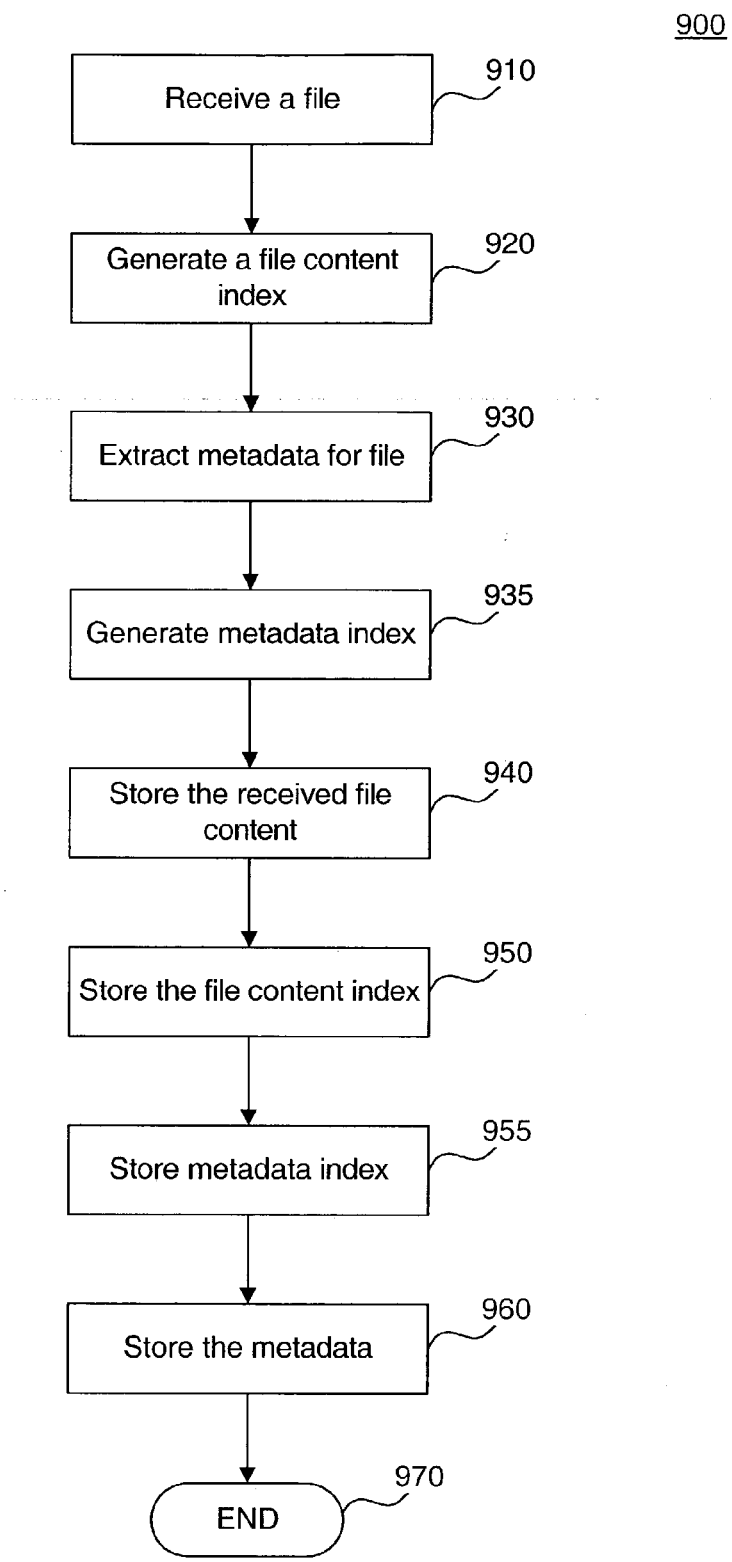
FIG. 9 is a flow chart of a method to store distributed content, according to an embodiment of the invention.

FIG. 9 provides a flow chart of method 900 to store distributed content, according to an embodiment of the invention. Method 900 begins in step 910. In step 910, a file is received. For example, indexed archive system 110 can receive a file from information source agent 120A. In step 920 a file content index is generated for the received file. For example, indexing engine 310 can generate a content index for a received file. In step 930, metadata for the received file is extracted. For example, metadata engine 315 can extract metadata from a received file. In step 935, a metadata index is generated. In one example, metadata engine 315 can generate a metadata index based on metadata extracted from a received file. In step 940, the received file is stored. For example, in one case content engine 320 could store the received file content in content repository 345. In step 950, the file content index is stored. For example, indexing engine 310 could store the file content index in index repository 335. In step 955, the metadata index is stored. In step 960, the metadata is stored. For example, metadata engine 315 can store both the metadata index and the metadata in metadata repository 340. In step 970, method 900 ends.

Figure 10:
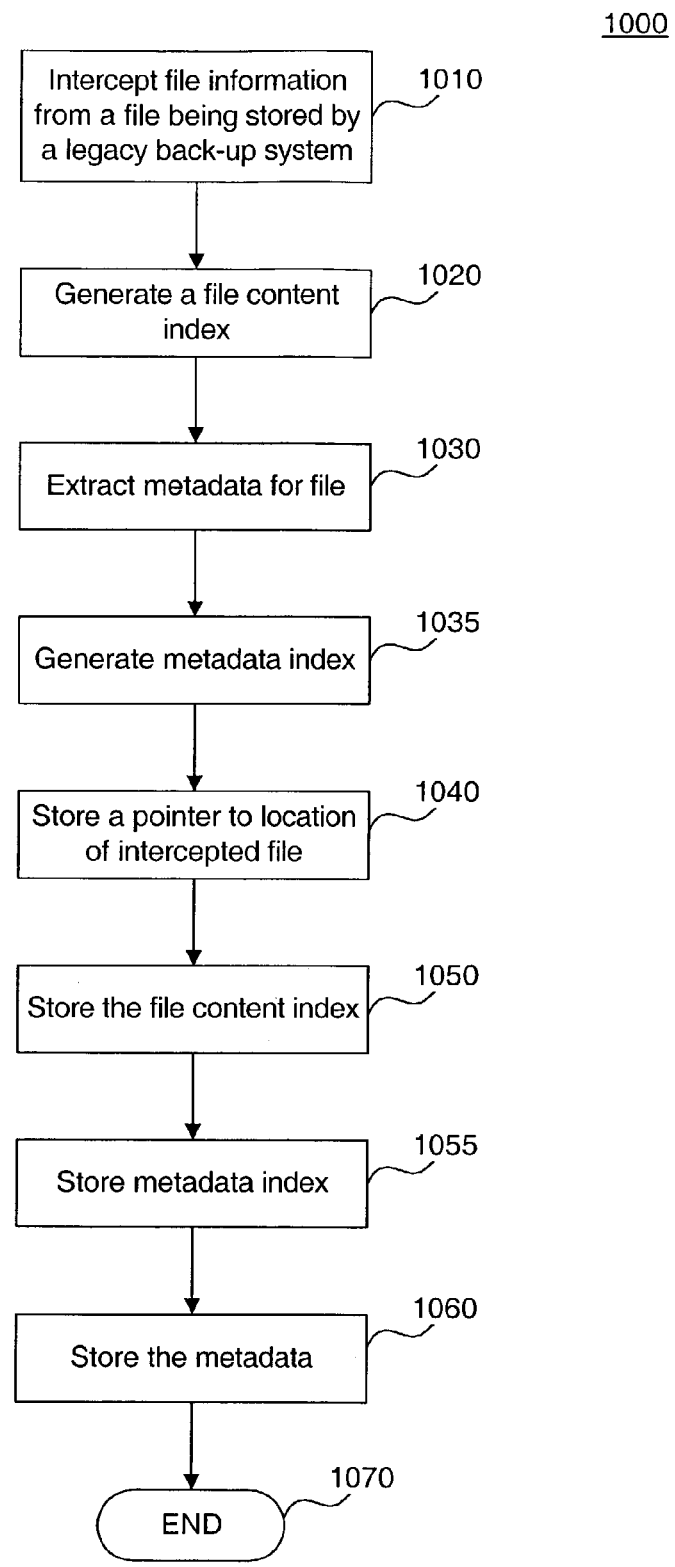
FIG. 10 is a flow chart of a method to store content information associated with files stored in a legacy back-up system, according to an embodiment of the invention.

FIG. 10 provides a flow chart of method 1000 to store content information associated with files stored in a legacy back-up system, according to an embodiment of the invention. Method 1000 begins in step 1010. In step 1010 file information from a file being stored by a legacy back-up system, such as legacy back-up system 410, is intercepted. In one example, the file information can be intercepted through the use of a proxy, such as proxy 440, in which a file gathering interface, such as file gathering interface 365 gathers the file information. In another example, a file gathering interface, such as file gathering interface 365, can employ a sniffing routine to monitor and gather information transmitted via a network to a legacy back-up system, such as legacy back-up system 410 to gather file information. The remaining steps are similar to the comparable steps in method 900, and can employ similar devices to perform the steps. In step 1020 a file content index is generated for the received file. In step 1030, metadata for the received file is extracted. In step 1035, a metadata index is generated. In step 1040, the received file is stored. In step 1050, the file content index is stored. In step 1055, the metadata index is stored. In step 1060, the metadata is stored. In step 1070, method 1000 ends.

Figure 11A:
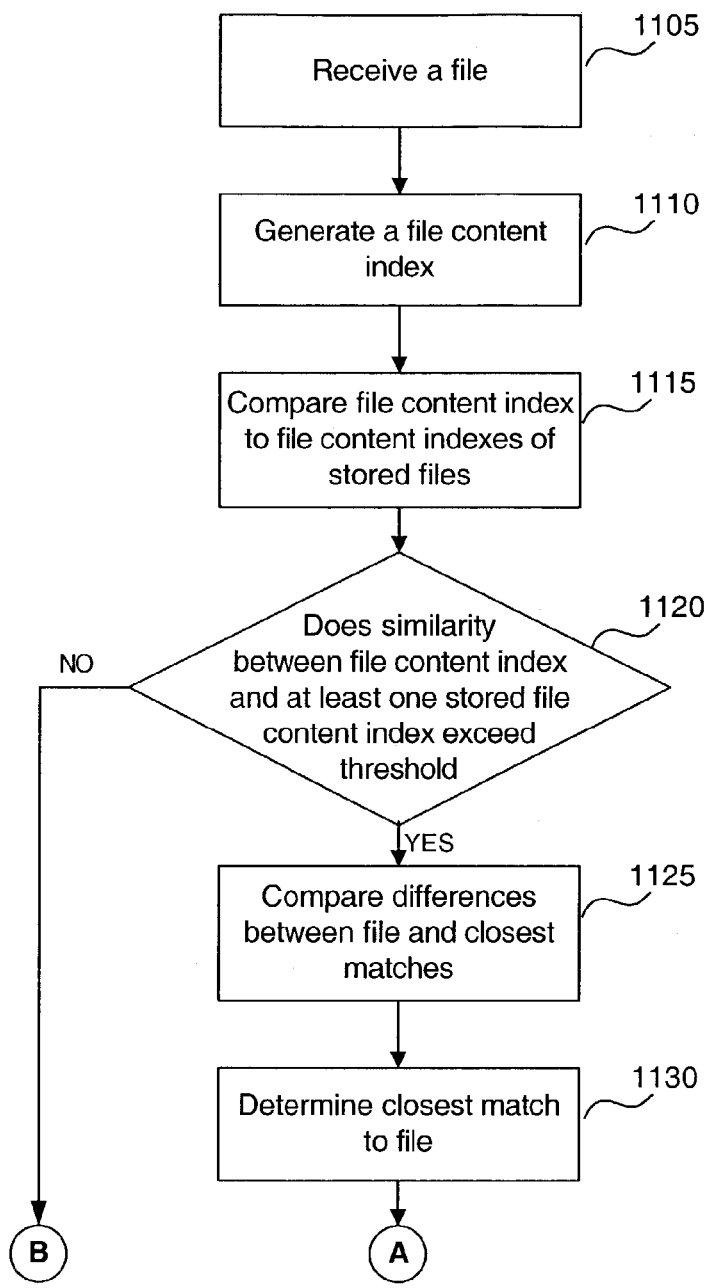
FIGS. 11A and 11B are flow charts of a method to store distributed content using a content similarity test, according to an embodiment of the invention.
Figure 11B:
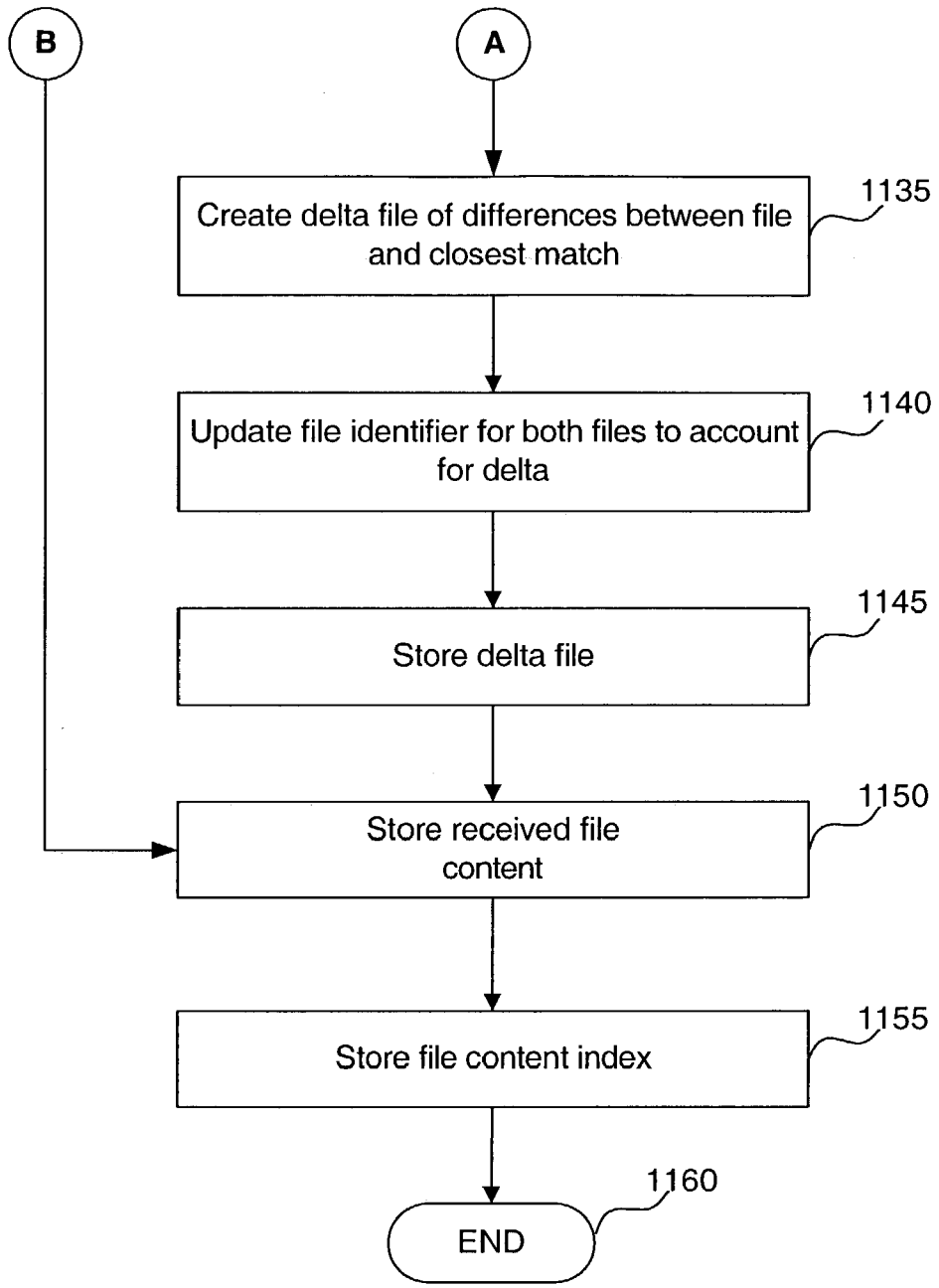

FIGS. 11A and 11B provide a flow chart of method 1100 to store distributed content using a content similarity test, according to an embodiment of the invention. Method 1100 begins in step 1105. In step 1105, a file is received. For example, the file could be received by indexed archive system 110. In step 1110, a file content index is generated. For example, indexing engine 310 can generate a file content index. In step 1115, the file content index for the received file is compared to the file content indexes of stored files. In one example, the file content indexes are stored in content repository 345 and indexing engine 310 does the comparison. In step 1120, a determination is made whether the similarity of the file content index for the received file and at least one stored file content index exceeds a similarity threshold. In one example, indexing engine 310 makes this determination.

If the similarity threshold is not exceeded, method 1100 proceeds to step 1150. If the similarity threshold is exceeded, method 1100 proceeds to step 1125. In step 1125, the differences between the received file and files that exceeded the similarity threshold are compared. In one example, the differences are determined by indexing engine 310. In step 1130, the file that most closely matches the received file is identified. In step 1135, a delta file of the differences between the received file and the closest match file is created. The delta file that is created can be generated either by forward or backward differencing, or both, between the received and stored file. In one example, content engine 320 can create the delta file. In step 1140, a file identifier for the received file and its closest match is updated to identify the existence of the delta file. If both differencing approaches are used, two delta files can be stored. In one example, these steps can be done by content engine 320. In step 1145, the delta file is stored. In one example, content engine 320 can store the delta file in content repository 345. In step 1150, the received file content is stored. In step 1155, the file content index for the received file is stored. In one example, indexing engine 310 stores the file content index in index repository 335.

In an alternative embodiment of method 1100, delta files can be created for all stored files that exceed a similarity threshold. In this case, their file identifiers would be updated to reflect the similarity, and a delta file for each of the stored files that exceeded a similarity threshold would be stored.

Figure 12A:
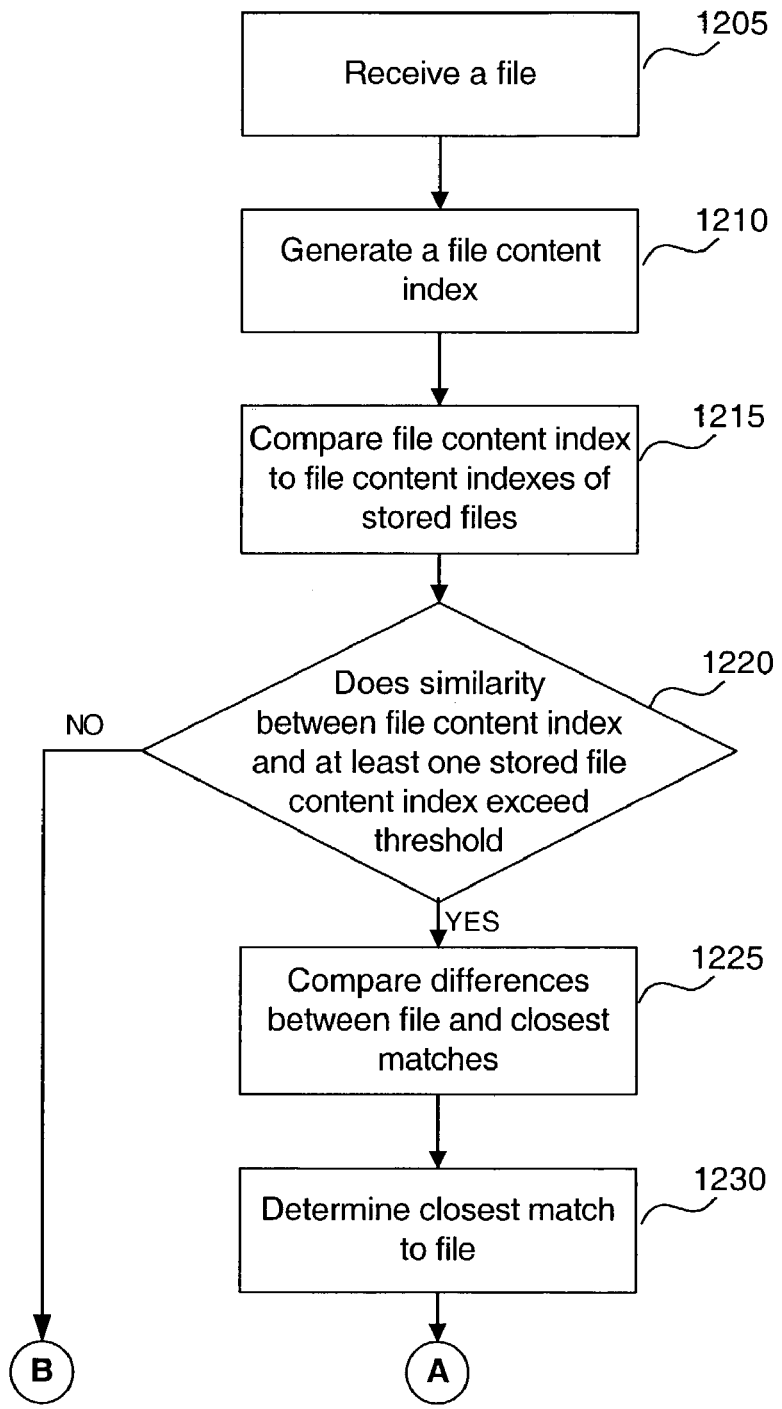
FIGS. 12A and 12B are flow charts of a method to store distributed content and conserve system resources, according to an embodiment of the invention.
Figure 12B:
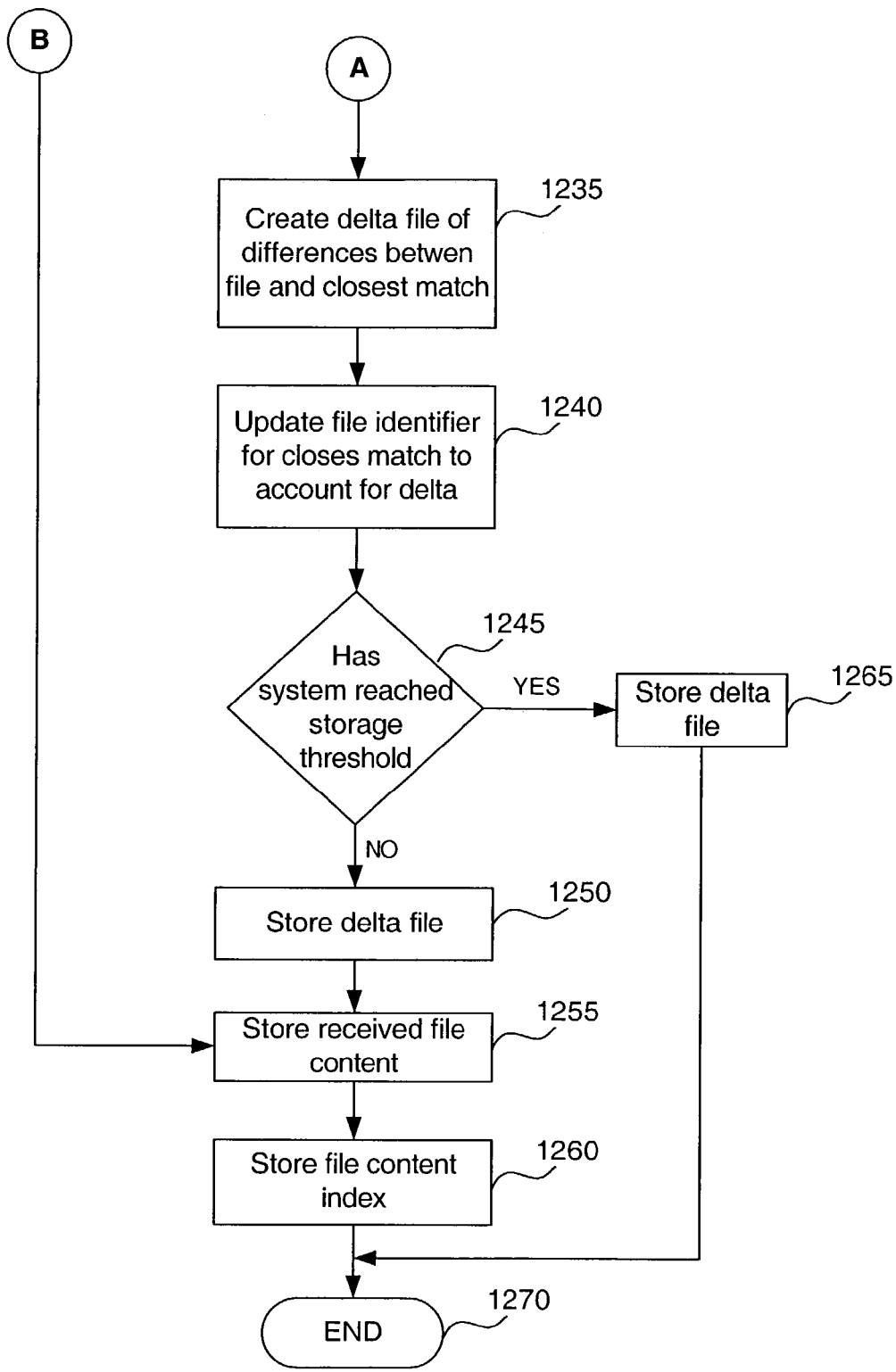

FIGS. 12A and 12B provide a flow chart of method 1200 to store distributed content and conserve system resources, according to an embodiment of the invention. Method 1200 begins in step 1205. In step 1205, a file is received. For example, a file can be received by index archive system 110. In step 1210 a file content index is generated. In one example, indexing engine, such as index engine 310, generates the file content index. In step 1215, the file content index for the received file is compared to the file content indexes of stored files. In step 1220, a determination is made whether the similarity of the file content index for the received file and at least one stored file content index exceeds a similarity threshold. In one example, indexing engine 310 conducts the comparison and determines whether a similarity threshold has been met.

If the similarity threshold is not exceeded, method 1200 proceeds to step 1255, and method 1200 proceeds as discussed below. If the similarity threshold is exceeded, method 1200 proceeds to step 1225. In step 1225, the differences between the received file and files that exceeded the similarity threshold are compared. In one example, the differences are determined by indexing engine 310. As in method 1100, either or both forward and backward differencing can be used. In step 1230, the file that most closely matches the received file is determined. In step 1235, a delta file of the differences between the received file and the closest match file is created. In one example, content engine 320 can create the delta file. In step 1240, a file identifier for the received file and its closest match is updated to identify the existence of the delta file. In step 1245, a determination is made whether a storage factor, such as a storage threshold, has been reached. In one example, storage thresholds can be set for the indexing repository 335, metadata repository 340 or content repository 345, or any combination thereof. The storage threshold can be set to be equal to a percentage of the total storage capacity of the devices. In alternative embodiments, other factors can be used to determine whether a file or a portion of a file should be saved. Such factors can be based on the type of file, the user of the file, the importance of the file, and any combination thereof, for example.

If a determination is made that a storage threshold has been met or exceeded, method 1200 proceeds to step 1265. In step 1265, the delta file is stored. Method 1200 then proceeds to step 1270 and ends. If, on the other hand, in step 1245 a determination is made that a storage threshold has not been met, method 1200 proceeds to step 1250. In step 1250, the delta file is stored. In step 1255, the received file content is stored. In step 1260, a file content index for the received file is stored. In step 1270, method 1200 ends.

Figure 13A:
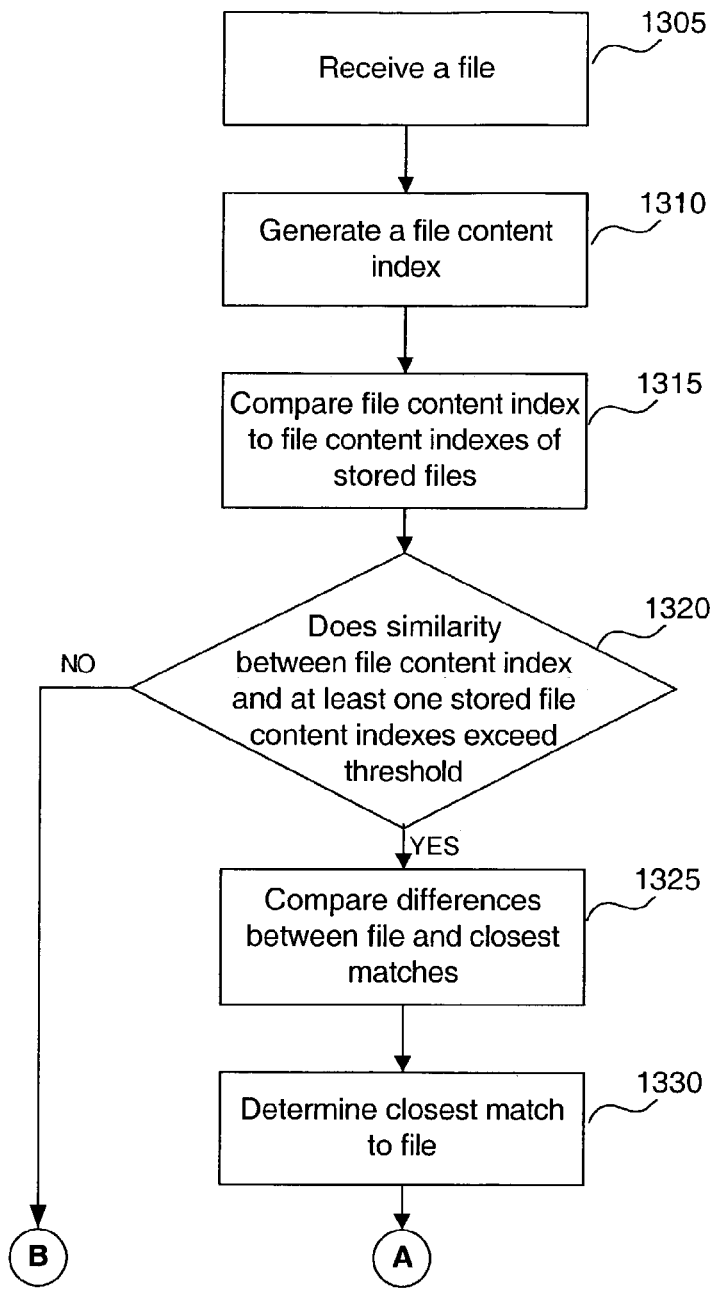
FIGS. 13A and 13B are flow charts of a method to store distributed content and identify relationships between files, according to an embodiment of the invention.
Figure 13B:
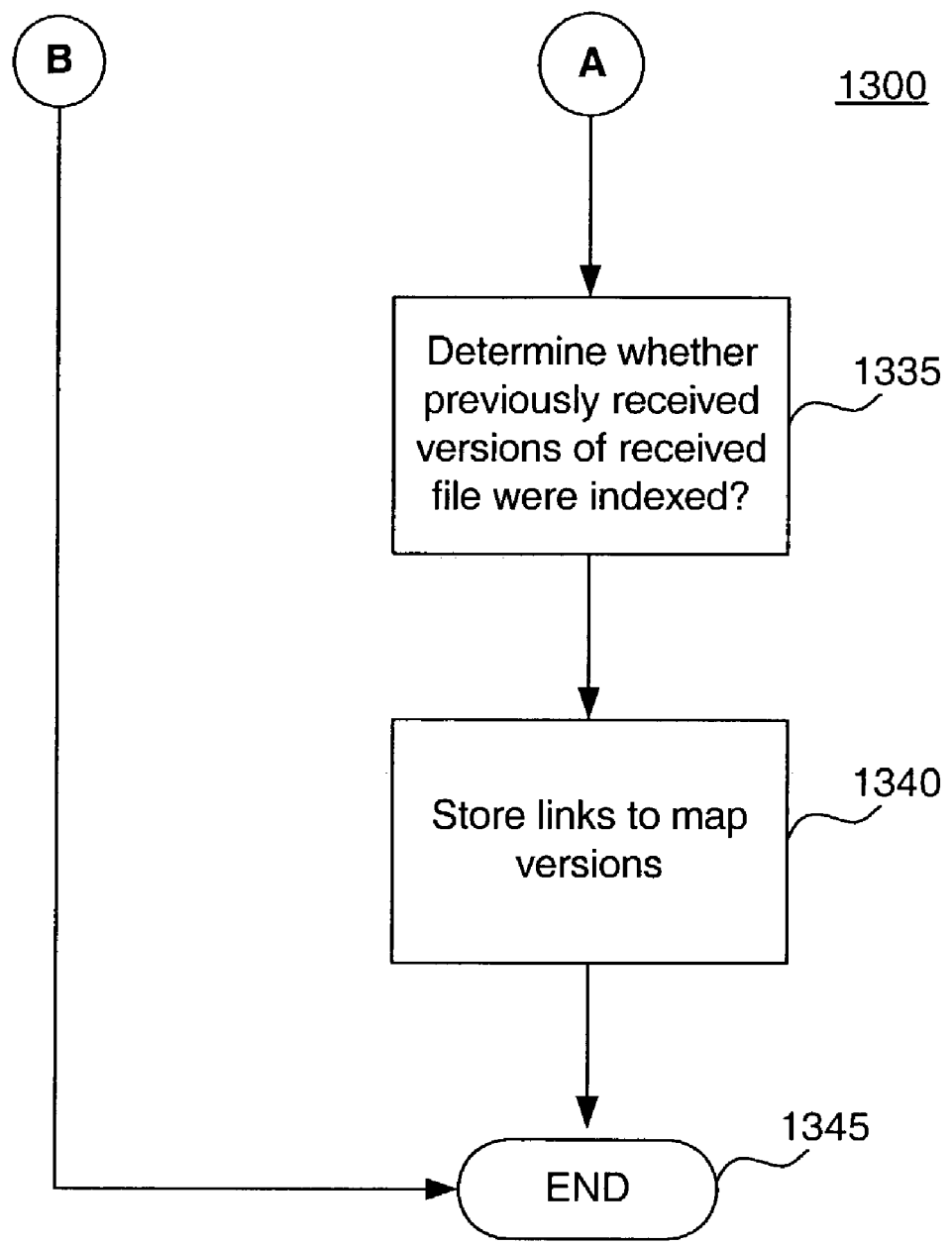

FIGS. 13A and 13B provides a flow chart of method 1300 to store distributed content and identify relationships between files, according to an embodiment of the invention. Method 1300 begins in step 1305. In step 1305, a file is received. For example, the file can be received by indexed archive system 110. In step 1310 a file content index is generated. For example, indexing engine 310 can generate a file content index. In step 1315, the file content index for the received file is compared to the file content indexes of stored files. In step 1320, a determination is made whether the similarity of the file content index for the received file and at least one stored file content index exceeds a similarity threshold. In one embodiment, the comparison and determination is made by indexing engine 310.

If the similarity threshold is not exceeded, method 1300 proceeds to step 1345 and ends. If the similarity threshold is exceeded, method 1300 proceeds to step 1335. In step 1335, a determination whether previously received versions of the received file were indexed is made. In one example, indexing engine 310 can be used to determine whether previously received versions of the received file were indexed. In step 1340, links to map previous versions of the received file with the received file are stored. In one example, metadata engine 315 can store the links in metadata repository 340. In step 1345, method 1300 ends. In an alternative embodiment, a link can be stored to identify that the received file shares content indexes exceeding a similarity threshold with one or more files that are not previous versions of the received file.

Figure 14:
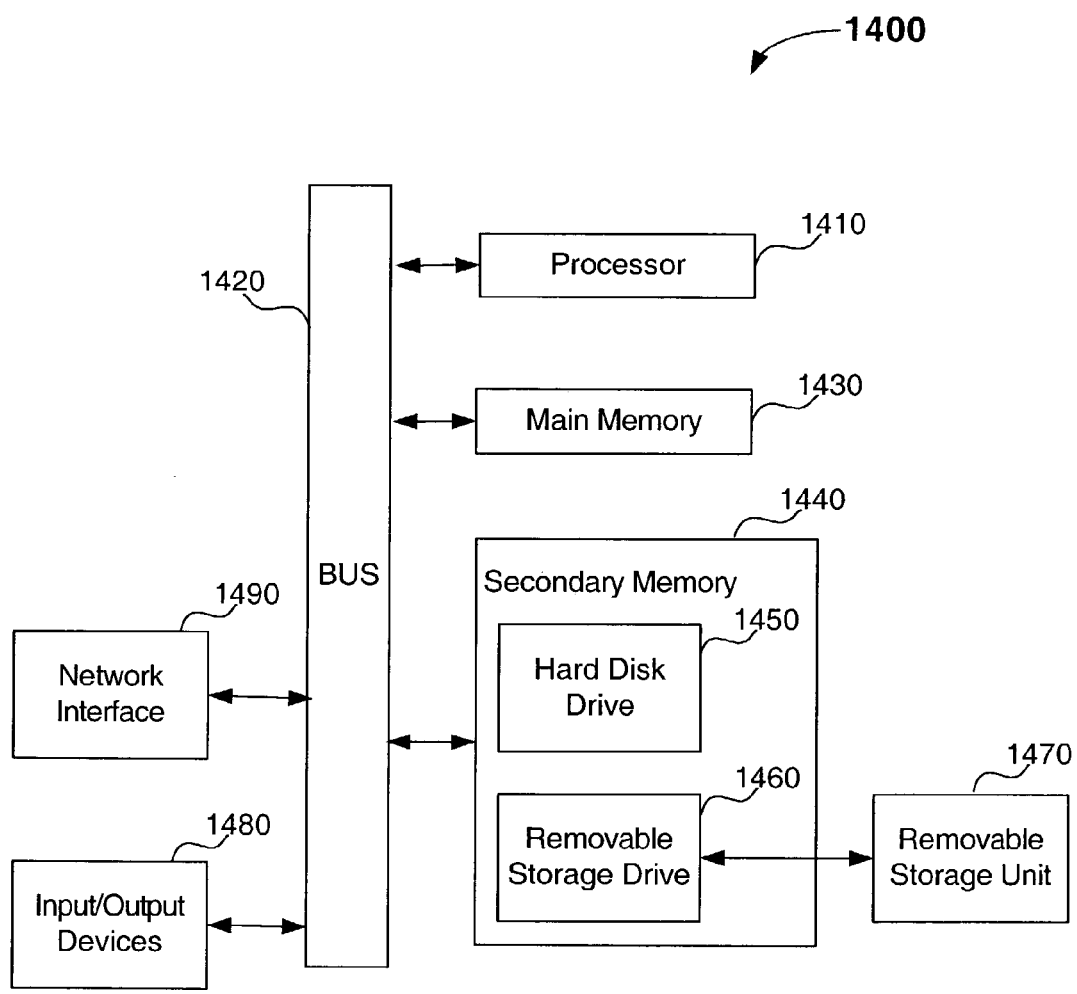
FIG. 14 is a diagram of a computer system on which the methods and systems herein described can be implemented, according to embodiments of the invention.

In an embodiment of the present invention, the methods and systems of the present invention described herein are implemented using well known computers, such as a computer 1400 shown in FIG. 14. The computer 1400 can be any commercially available and well known computer capable of performing the functions described herein, such as computers available from International Business Machines, Apple, Silicon Graphics Inc., Sun, HP, Dell, Cray, etc.

Computer 1400 includes one or more processors (also called central processing units, or CPUs), such as processor 1410. Processor 1400 is connected to communication bus 1420. Computer 1400 also includes a main or primary memory 1430, preferably random access memory (RAM). Primary memory 1430 has stored therein control logic (computer software), and data.

Computer 1400 may also include one or more secondary storage devices 1440. Secondary storage devices 1440 include, for example, hard disk drive 1450 and/or removable storage device or drive 1460. Removable storage drive 1460 represents a floppy disk drive, a magnetic tape drive, a compact disk drive, an optical storage device, tape backup, ZIP drive, JAZZ drive, etc.

Removable storage drive 1460 interacts with removable storage unit 1470. As will be appreciated, removable storage unit 1460 includes a computer usable or readable storage medium having stored therein computer software (control logic) and/or data. Removable storage drive 1460 reads from and/or writes to the removable storage unit 1470 in a well known manner.

Removable storage unit 1470, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 1400, or multiple computer 1400s to perform any combination of the functions described herein.

Computer programs (also called computer control logic) are stored in main memory 1430 and/or the secondary storage devices 1440. Such computer programs, when executed, direct computer 1400 to perform the functions of the present invention as discussed herein. In particular, the computer programs, when executed, enable processor 1410 to perform the functions of the present invention. Accordingly, such computer programs represent controllers of the computer 1400.

Computer 1400 also includes input/output/display devices 1480, such as monitors, keyboards, pointing devices, etc.

Computer 1400 further includes a communication or network interface 1490. Network interface 1490 enables computer 1400 to communicate with remote devices. For example, network interface 1490 allows computer 1400 to communicate over communication networks, such as LANs, WANs, the Internet, etc. Network interface 1490 may interface with remote sites or networks via wired or wireless connections. Computer 1400 receives data and/or computer programs via network interface 1490. The electrical/magnetic signals having contained therein data and/or computer programs received or transmitted by the computer 1400 via interface 1490 also represent computer program product(s).

The invention can work with software, hardware, and operating system implementations other than those described herein. Any software, hardware, and operating system implementations suitable for performing the functions described herein can be used.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A system for archiving and indexing files contained within information source clients, comprising:
    (a) a content engine for managing the storage of file content;
    (b) an indexing engine for indexing file data content;
    (c) a metadata engine for managing metadata characterizing a file; and
    (d) a triage engine for monitoring files as they are received by the system wherein said triage engine is coupled to and managing said content engine, said indexing engine and said metadata engine, the system further comprising an information entryway coupled to said triage engine, wherein said information entryway receives files from information source clients, wherein said system is embodied on one or more computer-readable storage medium.

2. The system of claim 1, further comprising an information source modification controller wherein said information source modification controller sends commands to the information source clients.

3. The system of claim 1, further comprising:
    (e) an index repository for containing searchable attributes of the file content and metadata of files;
    (f) a content repository for storing file content; and
    (g) a metadata repository for storing metadata, wherein said index repository, said content repository and said metadata repository are coupled to said information entryway.

4. The system of claim 3, further comprising a user interface for managing the system and searching for information about or contained within the indexed files.

5. The system of claim 4, further comprising a search engine coupled to said user interface.

6. The search engine of claim 5, wherein said search engine searches based on indexed file content.

7. The system of claim 5, wherein said search engine searches based on metadata.

8. The system of claim 5, wherein said search engine searches based on a combination of metadata and indexed file content.

9. The system of claim 1, further comprising a file gathering interface coupled to a legacy back-up system for gathering file information from files being stored by the back-up system.

10. In a network of information source clients wherein a back-up system stores back-up copies of files located on the information source clients to a repository a system for indexing files being processed by the back-up system, comprising:
    (a) an indexing engine for indexing tile content;
    (b) a metadata engine for managing metadata characterizing a file; and
    (c) a triage engine for monitoring files as they are received by the system wherein said triage engine is coupled to and managing said indexing engine and said metadata engine, the system further comprising an information entryway coupled to said triage engine, wherein said information entryway processes information intercepted from files being stored by the back-up system, wherein said system is embodied on one or more computer-readable storage mediums.

11. The system of claim 10, further comprising a file gathering interface coupled to the back-up system for gathering file information from files being stored by the back-up system.

12. The system of claim 10, further comprising a file administration interface coupled to the back-up system for accessing file administration activity of the back-up system.

13. The system of claim 10, further comprising a file management interface coupled to the back-up system for managing files stored by the back-up system.

14. The system of claim 10, further comprising:
 (d) an index repository for containing searchable attributes of the file content and metadata of files; and
 (e) a metadata repository for storing metadata, wherein said index repository, said content repository and said metadata repository are coupled to said information entryway.

15. The system of claim 14, further comprising a user interface for managing the system and searching for information about or contained within the indexed files.

16. The system of claim 15, further comprising a search engine coupled to said user interface.

17. The search engine of claim 16, wherein said search engine searches based on indexed file content.

18. The search engine of claim 16, wherein said search engine searches based on metadata.

19. The search engine of claim 16, wherein said search engine searches based on a combination of metadata and indexed file content.

* * * * *